(12) United States Patent
Sella et al.

(10) Patent No.: US 6,668,326 B1
(45) Date of Patent: Dec. 23, 2003

(54) CONTEXT SAVING SYSTEM

(75) Inventors: Yaron Sella, Jerusalem (IL); Moshe Shlissel, Jerusalem (IL)

(73) Assignee: NDS Limited, Middlesex (GB)

( * ) Notice: Subject to any disclaimer, the term of this patent is extended or adjusted under 35 U.S.C. 154(b) by 0 days.

(21) Appl. No.: 09/316,256

(22) Filed: May 21, 1999

(65) Prior Publication Data (65)

(30) Foreign Application Priority Data

May 21, 1998 (IL) ................................................ 124594

(51) Int. Cl.[7] ........................... H04L 9/00; G06F 11/00
(52) U.S. Cl. ..................... 713/201; 713/200; 700/121; 716/8; 716/9; 380/279; 380/30; 705/404
(58) Field of Search ............................. 700/121; 716/8, 716/9; 701/213; 380/279, 30; 713/185, 201, 172, 180, 193, 200; 705/404

(56) References Cited

U.S. PATENT DOCUMENTS

| | | | |
|---|---|---|---|
| 4,733,346 A | 3/1988 | Tanaka | 364/200 |
| 4,851,992 A | 7/1989 | Nakayama | 364/200 |
| 5,168,566 A | 12/1992 | Kuki et al. | 395/650 |
| 5,293,424 A * | 3/1994 | Holtey et al. | 713/193 |
| 5,613,114 A | 3/1997 | Anderson et al. | 395/678 |
| 6,092,202 A * | 7/2000 | Veil et al. | 713/201 |

FOREIGN PATENT DOCUMENTS

| | | | |
|---|---|---|---|
| WO | 94/11816 | 5/1994 | G06F/9/46 |
| WO | 97/17654 | 5/1997 | G06F/9/46 |

OTHER PUBLICATIONS

Tanenbaum, A.S. "Operating System Concepts" in Tanenbaum A.S. Operating Systems: Design and Implementation (N.J.–Prentice–Hall,1987) pp15+16.

* cited by examiner

*Primary Examiner*—Ly V. Hua
(74) *Attorney, Agent, or Firm*—Ladas & Parry

(57) ABSTRACT

A method for performing a computation task in a secure processor removably operatively associated with a host including a memory external to the secure processor. The method includes computing a portion of the task in the secure processor, obtaining a setting representation of settings of processing components of the secure processor at the end of the computing step, transmitting the setting representation to the external memory, retrieving the setting representation from the external memory, providing the setting representation to the secure processor, and resuming computation of the task in the secure processor by employing the setting representation.

24 Claims, 5 Drawing Sheets

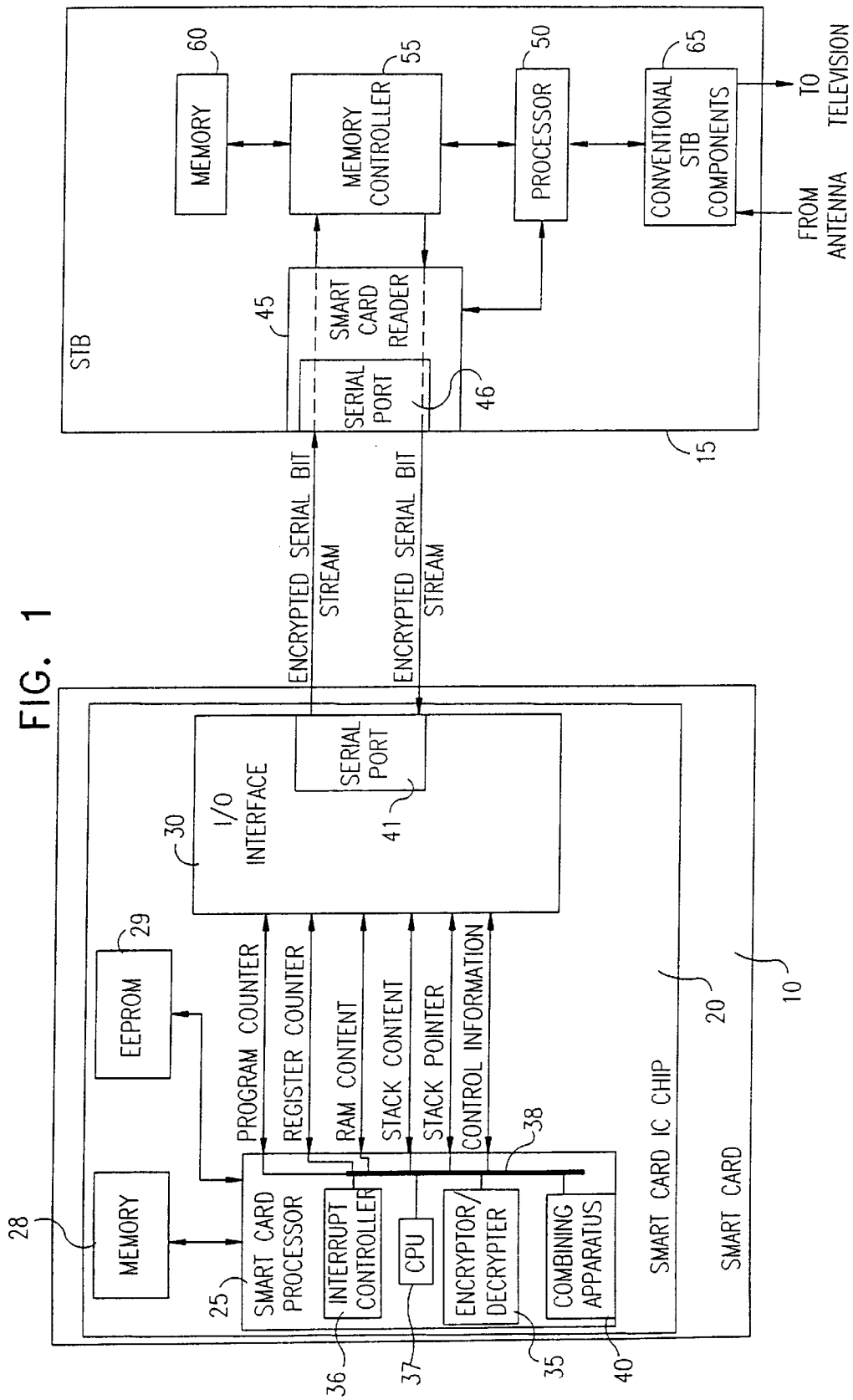

CONTEXT SAVING SYSTEM

FIELD OF THE INVENTION

The present invention relates to secure processing devices generally, and particularly to smart cards which operate in conjunction with an external host, such as a set-top box.

BACKGROUND OF THE INVENTION

Smart cards are typically employed in systems such as pay television systems and telephone systems to provide access to various services. Typically, the smart cards include secure algorithms which, when executed, are operative to generate access codes or keys which allow access to the services.

However, smart cards are generally limited by their low capacity memories and low processing performance which become a limitation when heavy computation tasks are executed. In such a case, a memory in a smart card has to be emptied and loaded many times during execution of a heavy computation task. This generally has an effect on computation speed and on the output of data from the smart. The tradeoff between memory size and computation speed is well known in the art.

SUMMARY OF THE INVENTION

The present invention seeks to provide an improved method and system for performing heavy computation tasks in systems based on secure processors.

In the present invention a secure processor, such as a smart card processor comprised in a smart card, classifies or receives a classification of computation tasks as either real-time tasks or non-real-time tasks, and processes real-time computation tasks without interruption. However, non-real-time tasks, which are generally heavy computation tasks, are computed uninterrupted only as long as a new real-time task is not waiting to be processed.

If a non-real-time task is processed and a new real-time task which is waiting to be processed is detected, the smart card processor interrupts the processing of the non-real-time task, thus resulting in computation of only a portion of the non-real-time task, and starts processing the new real-time task. Interruption of processing is performed either in response to an internal instruction in the smart card processor, or in response to an instruction transmitted to the smart card processor by the host.

At the end of the processing of the portion of the heavy computation task, the smart card processor obtains a setting representation of settings of processing components of the smart card processor. The setting representation generally includes settings of at least one of the following processing components: a program counter; a register; a RAM; a stack pointer; and a stack.

The setting representation obtained at the end of the portion of the computation task is typically encrypted and is transmitted in an encrypted form to a memory external to the smart card for storage therein. The memory external to the smart card may be a memory in a host, such as a computer or a set-top box (STB), and the smart card typically communicates with the host and the host memory via a conventional smart card reader.

When the smart card processor is ready to resume computation of the heavy computation task, or when the smart card processor receives from the host an instruction to resume computation, the smart card processor retrieves the encrypted setting representation from the host memory, decrypts the encrypted setting representation, separates the decrypted setting representation to regenerate the settings of the processing components, and resumes computation of the heavy computation task by using the settings of the processing components as initial conditions for the rest of the heavy computation task.

The communication of setting representation between the smart card processor and the host memory is typically a two-way serial communication via serial ports included in the smart card and in the smart card reader.

There is thus provided in accordance with a preferred embodiment of the present invention a method for performing a computation task in a secure processor removably operatively associated with a host including a memory external to the secure processor, the method including:

computing a portion of the task in the secure processor;

obtaining a setting representation of settings of processing components of the secure processor at the end of the computing step;

transmitting the setting representation to the external memory;

retrieving the setting representation from the external memory;

providing the setting representation to the secure processor; and resuming computation of the task in the secure processor by employing the setting representation.

Preferably, the secure processor is included in a smart card.

Further preferably, the setting representation includes settings of at least one of the following processing components: a program counter; a register; a RAM; a stack pointer; and a stack. The setting of the RAM preferably includes a representation of the RAM content. The setting of the stack preferably includes a representation of the stack content.

Additionally, the method also includes the steps of:

encrypting the setting representation prior to the transmitting step; and decrypting the setting representation prior to the step of resuming computation.

Preferably, the step of providing includes the step of providing the setting representation to the secure processor in an encrypted form.

Additionally, the step of providing also includes the step of decrypting the setting representation prior to the step of resuming computation.

Preferably, the step of obtaining includes converting at least one of the settings of the processing components to a data bit stream.

Further preferably, the transmitting step includes:

combining data bit streams corresponding to the settings of the processing components to form a combined data bit stream; and transmitting the combined data bit stream to the external memory.

The external memory is preferably included in a host including a set-top box (STB). Alternatively, the external memory is included in a host including a computer.

Preferably, the computation task is operative to provide conditional access to at least one service provided via the STB.

Additionally, the method also includes the step of:

deleting the setting representation from the external memory in response to a disrupting event.

Preferably, the step of deleting includes deleting the setting representation after a time-out period.

Additionally, the method also includes the step of determining the portion of the task prior to the computing step by determining an end of the portion of the task.

Preferably, the end of the portion of the task is determined in response to a hardware interrupt.

Preferably, the computing step includes:
- computing the task in the secure processor until a hardware interrupt indicating a request to process a new real-time task is received at the secure processor; and
- determining the portion of the task as a portion of the task computed until reception of the hardware interrupt indicating a request to process the new real-time task.

Further preferably, the computing step includes:
- periodically checking whether a new computation task classified as a real-time task is waiting to be processed;
- computing the task in the secure processor as long as a real-time task is not waiting to be processed; and
- if a real-time task is waiting to be processed:
  - ceasing computation of the task when the real-time task waiting to be processed is detected; and
  - determining the portion of the task as a portion of the task computed until detection of the real-time task waiting to be processed.

Additionally, the method also includes the step of executing the real-time task waiting to be processed.

There is also provided in accordance with a preferred embodiment of the present invention a method for performing a computation task in a secure processor operatively associated with an external memory external to the secure processor, the method including:
- computing at least a portion of the task in the secure processor;
- obtaining a setting representation of settings of processing components of the secure processor at the end of the computing step; and
- employing serial communication to transmit the setting representation to the external memory for storage in the external memory, and to receive the setting representation from the external memory for resumption of computation of the task in the secure processor by use of the setting representation.

In accordance with a preferred embodiment of the present invention there is also provided a method for performing computation tasks in a plurality of secure processors operatively associated with an external memory external to all of the plurality of secure processors, the method including:
- computing, in each of the plurality of secure processors, a computation task:
- recognizing an interruption in computation in a group of secure processors, the group including at least one of the plurality of secure processors;
- identifying each secure processor in the group;
- obtaining a setting representation of settings of processing components of each secure processor in the group at time of occurrence of the interruption in computation;
- transmitting each setting representation corresponding to each secure processor in the group to the external memory;
- retrieving the each setting representation corresponding to each secure processor in the group from the external memory;
- restoring the each setting representation corresponding to each secure processor in the group to each secure processor in the group in accordance with the identifying step; and
- resuming computation in each secure processor in the group by employing the each setting representation corresponding to each secure processor in the group.

Preferably, the identifying step includes the step of employing processor identification codes to identify each secure processor in the group.

There is also provided in accordance with a preferred embodiment of the present invention a smart card including:
- a smart card processor including:
  - determining apparatus operative to determine a portion of a computation task to be processed; and
  - a central processing unit (CPU), operatively associated with the determining apparatus and operative to compute the portion of a computation task, and to obtain a setting representation of settings of processing components of the smart card processor after the portion of a computation task is computed;
- a smart card output interface operatively associated with the smart card processor for transmitting the setting representation to an external memory external to the smart card; and
- a smart card input interface operatively associated with the smart card processor for receiving the setting representation from the external memory, wherein
  - the smart card processor is operative to resume computation of the task by employing the setting representation received from the external memory.

Preferably, the determining apparatus includes an interrupt controller.

Additionally, the smart card also includes an encryptor/decrypter associated with the smart card processor for encrypting the setting representation transmitted by the smart card output interface, and for decrypting the setting representation received by the smart card input interface.

There is also provided in accordance with a preferred embodiment of the present invention a system including the smart card and the external memory external to the smart card, wherein the external memory is included in a set-top box (STB).

Preferably, the smart card is operative to provide conditional access to at least one service provided via the STB.

There is also provided in accordance with a preferred embodiment of the present invention a secure processor operatively associated with an external memory external to the secure processor, the secure processor including:
- determination apparatus operative to determine a portion of a computation task to be processed;
- identification apparatus operative to identify the secure processor from a plurality of secure processors;
- a CPU operatively associated with the determination apparatus and with the identification apparatus and operative to compute the portion of a computation task, and to obtain a first setting representation of settings of processing components of the secure processor after the portion of a computation task is computed;
- an output interface operatively associated with the CPU and operative to transmit the first setting representation to the external memory; and
- an input interface operatively associated with the CPU and operative to receive a second setting representation from the external memory, and to provide the second setting representation to the CPU, wherein
  - the secure processor is operative to resume computation of the task by employing the second setting representation received from the external memory if the identification apparatus identifies that the second setting representation belongs to the secure processor.

BRIEF DESCRIPTION OF THE DRAWINGS

The present invention will be understood and appreciated more fully from the following detailed description, taken in conjunction with the drawings in which:

FIG. 1 is a generalized block diagram illustration of a preferred implementation of a system comprising a smart card operatively associated with a host shown as a set-top box (STB), the system being constructed and operative in accordance with a preferred embodiment of the present invention;

DETAILED DESCRIPTION OF A PREFERRED EMBODIMENT

Figure 2A:
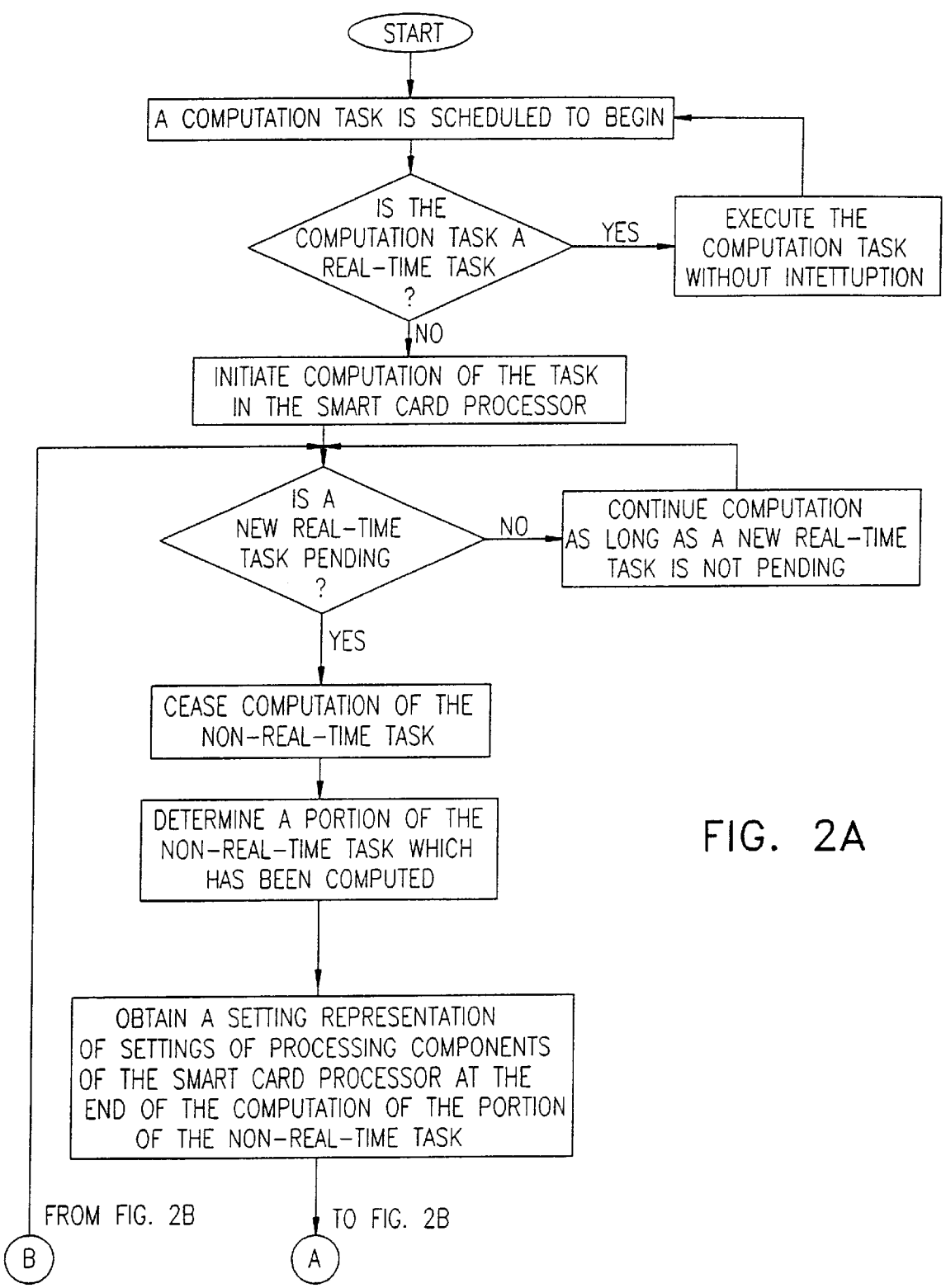
FIGS. 2A and 2B together constitute a simplified flow chart illustration of a preferred method of operation of the apparatus of FIG. 1.

Reference is now made to FIG. 1 which is a generalized block diagram illustration of a preferred implementation of a system comprising a smart card 10 operatively associated with a host shown as a set-top box (STB) 15, the system being constructed and operative in accordance with a preferred embodiment of the present invention. It is appreciated that the invention is not limited by the nature of the host, and other appropriate types of hosts, such as a computer, may alternatively be operatively associated with the smart card 10. It is further appreciated that the invention is not limited to secure processors in smart cards; other types of secure processors may be used, such as a secure processor in a PCMCIA card. Whenever the present invention is described with reference to the functions of an STB, it is appreciated that the description is not meant to be limiting.

Preferably, the smart card 10 includes an integrated circuit (IC) chip 20 which may preferably include a smart card processor 25. The smart card 10 also preferably includes a volatile memory 28 and an EEPROM (Electronic Erasable Read Only Memory) 29 which are preferably accessible only by the smart card processor 25, and an input/output (I/O) interface 30 operatively associated with the smart card processor 25 for receiving inputs and for providing outputs. The smart card processor 25 may include the following units: an encryptor/decrypter 35 which may be implemented in hardware or in software; an interrupt controller 36; a central processing unit (CPU) 37; and combining apparatus 40 which is operative to combine/separate data into/from a combined data bit stream. The units 35, 36, 37 and 40 are typically operatively associated with each other via a data bus 38 which is also operatively associated with the I/O interface 30. It is appreciated that the interrupt controller 36 and the combining apparatus 40 are optional.

Preferably, the I/O interface 30 may include a serial port 41 which is operative to provide two-way serial communication with units external to the smart card 10.

It is appreciated that the smart card processor 25, the memory 28, and the I/O interface 30 need not be separate units, but may preferably be embodied in a single integrated circuit element, such as in the chip 20.

Preferably, the smart card 10 communicates with the STB 15 via a smart card reader 45 which is comprised in the STB 15. The smart card reader 45 may preferably include a serial port 46 which is operative to provide two-way serial communication with units external to the STB 15.

Preferably, the STB 15 may also include a processor 50 and a memory controller 55 which are each operatively associated with the smart card reader 45.

The memory controller 55 is preferably operative to control a memory 60 so as to enable reading, data from and writing data to the memory 60 in response to commands provided by the processor 50 or commands provided by the smart card 10 via the smart card reader 45. It is appreciated that the memory controller 55 need not be a separate unit, but may rather be an embedded unit comprised in the processor 50 or in the memory 60.

Typically, the STB 15 also includes conventional components 65 which provide conventional functions such as, for example, receiving, decoding and tuning of television signals which are supplied via a signal source, such as an antenna (not shown), and access to services, such as Internet access services including services such as, E-mail and video conference. The conventional components 65 provide signals to a television (not shown) in a format suitable for display on the television.

If the unit 15 is a host other than an STB, the conventional components 65 may provide access to areas and items, or may control operation of systems, such as elevators or any other type of electric machinery.

In typical applications, as is well known in the art, smart card processors perform real-time and non-real-time computations and provide access control data, which may include seeds and keys, to STBs associated therewith. The access control data preferably enables access to at least one service provided via the STBs.

However, since smart card memories, associated with the smart card processors, are typically low capacity memories, execution of a long, heavy computation task in a smart card, as is well known in the art, may require extra operations because of the well known tradeoff of processing time versus memory time, and execution in this case is thus time consuming.

Additionally, if during processing of a heavy computation task an instruction to process a real-time computation task is provided, the heavy computation task may be interrupted, and intermediate computation results of the heavy computation task may be lost. Even worse, a time-sensitive real-time task deferred until the end of a heavy computation task may be lost, in that the appropriate time for performing the real-time task may have passed, before the heavy computation task reaches its conclusion. Thus, processing of heavy computation tasks in prior art smart card based systems is inconvenient.

The operation of the apparatus of FIG. 1 is now briefly described. The smart card processor 25 periodically checks a queue of computation tasks to be processed. Preferably, the smart card processor 25 classifies, or receives from the STB 15 a classification of, the computation tasks in the queue as either real-time tasks or non-real-time tasks. Real-time tasks are typically tasks related to computation of control words which are employed to decrypt transmissions related to an encrypted service, but it is appreciated that a variety of other real-time tasks, to be computed by the smart card processor 25, may also be included in the computation tasks in the queue. Non-real-time tasks are typically tasks related to updates of information and parameters in the smart card 10 and other tasks which are not real-time.

If a task is classified as a real-time task, the task is preferably processed without interruption so that interrupt requests, which may arrive during processing of the real-time task, are disabled. If, however, the task is classified as a non-real-time task, computation of the task may be interrupted as described below.

Preferably, when a non-real-time task, which is typically a heavy computation task, is processed, the smart card processor 25 keeps checking periodically whether a new task is waiting to be processed. In order to enable such periodic checking, the smart card processor 25 preferably splits, at convenient break points, the non-real-time task into smaller sub-tasks, and polls the queue for new tasks at the end of each sub-task. The smart card processor 25 preferably processes the non-real-time task as long as a new real-time task is not waiting to be processed.

If a new real-time task waiting to be processed is detected, the smart card processor 25, preferably ceases computation of the non-real-time task and starts processing the new real-time task. It is appreciated that ceasing computation of the non-real-time task when the non-real-time task is not completed implicitly determines a portion of the non-real-time task which has been processed.

Alternatively, the smart card processor 25 may not periodically check whether a request to process a real-time task is received, but rather determining apparatus, such as the interrupt controller 36 if present, may be employed to respond to an arbitrarily received hardware interrupt indicating a request for processing a new task. In such a case, the smart card processor 25 checks whether the new task is a real-time task. If the new task is a non-real-time task, the new task is placed in a queue scheduled for later processing.

If, however, the new task is a real-time task, the smart card processor 25 preferably interrupts the processing of the non-real-time task, thus resulting in computation of only a portion of the non-real-time task. In such a case, the length of the portion of the non-real-time task is determined by the time elapsed from initial processing of the non-real-time task till occurrence of the real-time task in the waiting queue regardless of the method used by the smart card processor 25 to detect the new real-time task which is waiting to be processed.

It is appreciated that the task may include portions whose processing cannot be interrupted. In such a case, if a hardware interrupt indicating a request for processing a real-time task is received during processing of a portion of the task which processing cannot be interrupted, interruption of the task is preferably delayed until the end of the portion of the task which processing cannot be interrupted.

Preferably, at the end of the processing of the portion of the heavy computation task, the smart card processor 25 obtains a setting representation of settings of processing components of the smart card processor 25. The setting representation may preferably include settings of at least one of the following processing components: a program counter; a register; a RAM; a stack pointer; and a stack. The setting of the RAM may preferably include a representation of the RAM content, and the setting of the stack may preferably include a representation of the stack content.

It is appreciated that at the end of the computation of the portion of the heavy computation task, at least one processing component which is used during the computation attains a determined state or a determined value. The term "a setting of a processing component" as used throughout the specification and claims includes a determined state or a determined value attained by the processing component.

The setting representation preferably represents the context of the smart card at the end of the portion of the heavy computation task in a format suitable to be saved in memory and later restored from memory thus allowing computation to resume from the point at which the setting representation was obtained. Preferably, the setting representation is generated by the smart card processor 25, which is operative to combine, in the combining apparatus 40, settings of processing components that are used during the computation and to convert, as necessary, the settings to a data bit stream usable by a processor and suitable for storage in a memory. It is appreciated that the smart card processor 25 may combine the settings of processing components by serially providing data communicated via the data bus 38 to the I/O interface 30 without using the combining apparatus 40.

Preferably, in order to maintain security, the setting representation is encrypted in the encryptor/decrypter 35 to form an encrypted data bit stream. Once the setting representation is obtained, preferably in an encrypted form, the smart card processor 25 preferably stores the setting representation in a memory external to the smart card 10, such as the STB memory 60, by providing the setting representation to the I/O interface 30 which transmits the setting representation in the encrypted data bit stream format to the STB memory 60 via the smart card reader 45 and the memory controller 55. Preferably, transmission of the setting representation to the STB memory 60 and reception of the setting representation at the STB memory 60 are performed via the serial ports 41 and 46 respectively by employing serial communication. However, if the I/O interface 30 and the smart card reader 45 include parallel ports (not shown), typically in addition to the serial ports 41 and 46, the transmission of the setting representation to the STB memory 60 and the reception of the setting representation at the STB memory 60 may be performed via the parallel ports by employing parallel communication.

It is appreciated that any appropriate memory external to smart card 10, such as a computer memory (not shown), may be used in place of the STB memory 60.

Preferably, when the smart card processor 25 is ready to resume computation of the heavy computation task, the smart card processor 25 sends a command via the I/O interface 30 and the smart card reader 45 instructing the memory controller 55 to retrieve the setting representation from the STB memory 60 and to transmit the setting representation back to the smart card processor 25 via the smart card reader 45 and the I/O interface 30. Transmission of the setting representation from the STB memory 60 back to the smart card 10 and reception of the setting representation at the smart card processor 25 are preferably performed via the serial ports 46 and 41 respectively by employing serial communication. However, as mentioned above, if the I/O interface 30 and the smart card reader 45 include parallel ports (not shown), typically in addition to the serial ports 41 and 46, the transmission of the setting representation from the STB memory 60 back to the smart card 10 and the reception of the setting representation at the smart card processor 25 may be performed via the parallel ports by employing parallel communication.

When the smart card processor 25 receives the setting representation retrieved from the STB memory 60, the smart card processor 25 preferably decrypts the encrypted data bit stream, and separates the decrypted data bit stream to regenerate the settings of the processing components. Then, the smart card processor 25 resumes computation of the heavy computation task by employing the settings of the processing components, preferably by using the settings of the processing components as initial conditions for the rest of the heavy computation task.

It is appreciated that the encryption of the setting representation and the two-way communication of the encrypted data bit stream resulting therefrom provide a level of security which is better than, or at least comparable to, the level of security obtained when the smart processor 25 accesses the internal smart card memories 28 and 29 without encryption as in the prior art smart card based systems. Preferably, the encryption of the context data may also provide an additional defense layer against potential hackers since typically, in order to read and reproduce information from the smart card 10, a hacker must find a decryption key or a decryption algorithm used to encrypt the setting representation representing the context data. It is appreciated that the context data may be encrypted by employing an encryption key or an encryption algorithm which is either the same as or different from an encryption key or an encryption algorithm a employed for the encrypted service to which the smart card 10 typically provides access.

It is appreciated that if a disrupting event occurs before the smart card processor 25 receives the setting representation from the memory 60, or during transfer of the setting representation to or from the memory 60, such as when a "RESET" command is executed or when a user removes the smart card 10 from the smart card reader 45, the setting representation is preferably deleted from the memory 60, preferably after a predetermined time-out period.

Figure 2B:
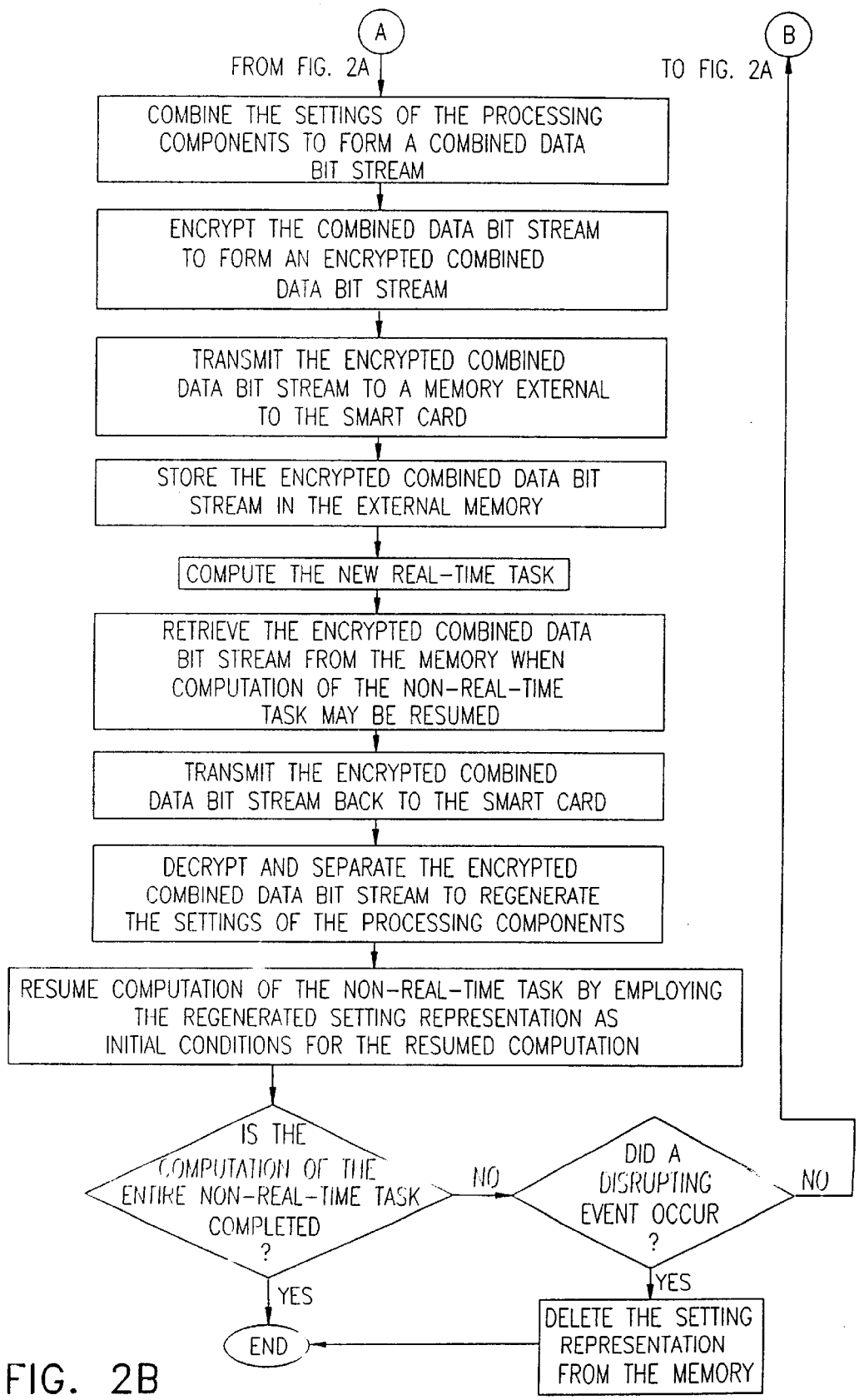

Reference is now additionally made to FIGS. 2A and 2B which together constitute a simplified flow chart illustration of a preferred method of operation of the apparatus of FIG. 1.

Preferably, a computation task which is scheduled to be processed is classified either as a real-time task or a non-real-time task. If the task is a real-time task, the task is processed without interruption, and when processing of the task is completed, computation of the next computation task may begin.

If the computation task is classified as a non-real-time task, computation of the task begins and preferably continues as long as a new real-time task is not pending. As mentioned before, the smart card processor 25 may either check periodically whether a new real-time task is waiting to be processed or may respond to a hardware interrupt received in case a new real-time task is pending. It is appreciated that if a new real-time task is not pending during the whole processing period of the task, computation of the task may be completed without interruption.

If a new real-time task waiting to be processed is detected, computation of the non-real-time task is ceased, a save procedure is performed, and computation of the new real-time task begins. Preferably, the save procedure is operative to store information for use by the smart card processor 25 upon resumption of the computation of the non-real-time task. It is appreciated that cessation of computation before computation of the non-real-time task is completed implicitly determines a portion of the non-real-time task which is computed.

Preferably, the save procedure starts by obtaining a setting representation of settings of processing components of the smart card processor 25 at the end of the computation of the portion of the non-real-time task. The settings of the processing components are preferably combined in the combining apparatus 40 to form a combined data bit stream, which is preferably encrypted in the encryptor/decrypter 35 to form an encrypted combined data bit stream. The encrypted combined data bit stream is preferably transmitted to a memory external to the smart card and is stored in the external memory for future use by the smart card processor 25.

Preferably, when computation of the non-real-time task may be resumed, i.e., when the smart card processor 25 is not busy computing a real-time task, a restore procedure is performed. Preferably, the restore procedure is operative to restore to the smart card processor 25 the information saved by the save procedure.

Preferably, the restore procedure starts by retrieving the encrypted combined data bit stream from the memory external to the smart card and transmitting the encrypted combined data bit stream back to the smart card 10. The encrypted combined data bit stream is preferably decrypted and separated to regenerate the settings of the processing components obtained when the computation of the task was ceased. Preferably, at the end of the restore procedure the regenerated settings of processing components are provided to the CPU 37 to enable the computation of the task to resume by employing the regenerated settings of processing components. It is appreciated that the regenerated settings of the processing components may be employed as initial conditions for the resumed computation.

The series of steps mentioned above including: executing the save procedure when execution of a non-real-time task is interrupted by occurrence of a real-time task; executing the real-time task; and executing the restore procedure when the non-real-time task may be resumed, may be repeated if another new real-time task which awaits processing is detected while the resumed computation of the non-real-time task is ongoing. It is appreciated that the series of steps may be performed at any stage of the computation of the non-real-time task when a new real-time task waiting to be processed is detected.

In a case that a disrupting event occurs during any stage of the two-way communication of the setting representation between the smart card 10 and the memory 60, such as when a "RESET" command is executed or when a user removes the smart card 10 from the smart card reader 45, the setting representation is preferably deleted from the memory 60, preferably after a time-out period. When the setting representation is lost, the task cannot generally be completed, and the whole task may be lost.

Figure 3:
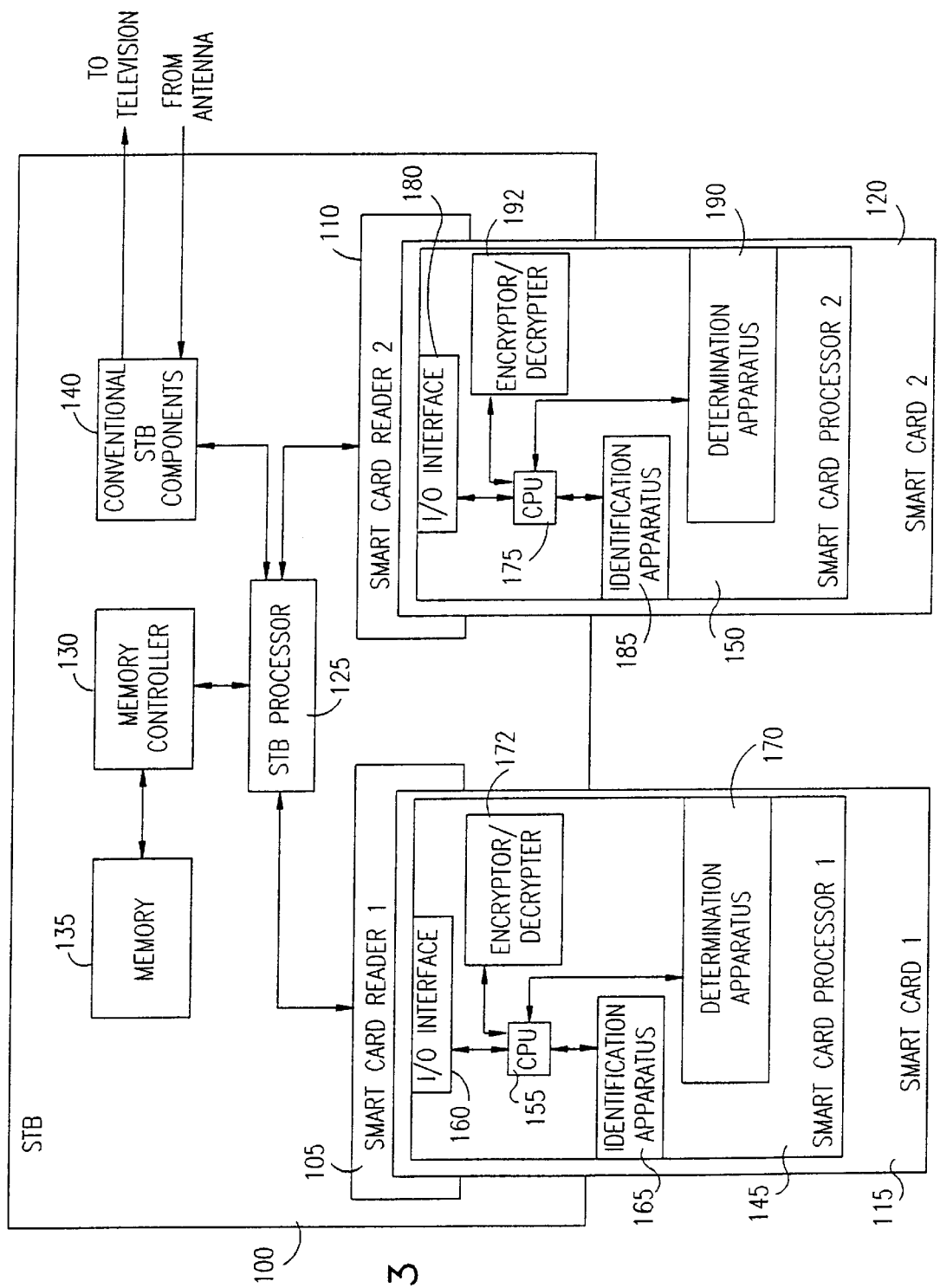
FIG. 3 is a generalized block diagram illustration of a preferred implementation of a system comprising a plurality of smart cards associated with a host shown as an STB, the system being constructed and operative in accordance with a preferred embodiment of the present invention.

Reference is now made to FIG. 3 which is a generalized block diagram illustration of a preferred implementation of a system comprising a plurality of smart cards associated with a host shown as an STB 100, the system being constructed and operative in accordance with a preferred embodiment of the present invention.

Preferably, the STB 100 is substantially similar to the STB 15 of FIG. 1 except that the STB 100 includes more than one interface to a smart card. For simplicity, the STB 100 is shown to include two smart card readers comprising a smart card reader 105 and a smart card reader 110 which are operatively associated with a smart card 115 and a smart card 120 respectively. It is appreciated that the embodiment of FIG. 3 is not limited by the number of smart card readers, and more than two smart card readers may be comprised in the STB 100.

Preferably, the STB 100 also includes an STB processor 125, a memory controller 130, and a memory 135. The STB processor 125 is operatively associated with each of the smart card readers 105 and 110, and with the memory 135 via the memory controller 130. The STB processor 125 is also operatively associated with conventional STB components 140 which provide conventional functions of receiving, decoding and tuning of television signals that are supplied from an antenna (not shown). The conventional STB components 140 typically provide signals to a television (not shown) in a format suitable for display on the television.

It is appreciated that the STB processor 125, the memory controller 130, the memory 135, and the conventional STB components 140 may be similar in structure to the processor 50, the memory controller 55, the memory 60, and the conventional STB components 65 respectively, and may have similar functionality.

Preferably, the smart card 105 includes a smart card processor 145 and the smart card 110 includes a smart card processor 150. The smart card processors 145 and 150 are preferably similar in structure, but the smart card processors 145 and 150 are preferably operative to provide access to different services, or otherwise to perform different tasks.

Preferably, the smart card processor 145 includes a CPU 155 and the following units which are operatively associated with the CPU 155: an I/O interface 160; identification apparatus 165; determination apparatus 170; and an encryptor/decrypter 172. The smart card processor 150 preferably includes a CPU 175 and the following units which are operatively associated with the CPU 175: an I/O interface 180; identification apparatus 185; determination apparatus 190; and an encryptor/decrypter 192.

It is appreciated that the CPU 155, the I/O interface 160, the identification apparatus 165, the determination apparatus 170, and the encryptor/decrypter 172 may be similar in structure to the CPU 175, the I/O interface 180, the identification apparatus 185, the determination apparatus 190, and the encryptor/decrypter 192 respectively.

The operation of the system of FIG. 3 is now briefly described. Preferably, each of the smart card processors 145 and 150 is operative to execute a computation task. Preferably, the identification apparatus 165 is operative to employ a processor identification code, such as "0001", individually identifying the smart card processor 145 from the smart card processor 150. The identification apparatus 185 preferably employs a different processor identification code, such as "0002".

If one of the computation tasks executed by the smart card processors 145 and 150 is interrupted, such as the computation task executed by the smart card processor 145, the determination apparatus 170 is preferably operative to determine a portion of a computation task that has been processed until interruption of the computation task. It is appreciated that the interruption of the computation task may occur when a user removes the smart card 115 from the smart card reader 105, or if the computation task is a non-real-time task that may be interrupted when a new real-time task pending in a queue of tasks to be processed is detected as described above with reference to FIG. 1.

Preferably, when the computation task is interrupted, the CPU 155 obtains a first setting representation of settings of processing components of the smart card processor 145 after the portion of a computation task is computed. Then, the CPU 155 combines the processor identification code of the smart card processor 145, i.e. the identification code "0001", with the first setting representation to form a first individually marked setting representation. Preferably, the CPU 155 transmits the first individually marked setting representation via the I/O interface 160 and the smart card reader 105 to the processor 125 which stores the first individually marked setting representation in the memory 135 via the memory controller 130.

It is appreciated that the first individually marked setting representation may preferably be encrypted in the encryptor/decrypter 172 prior to transmission to the processor 125, transmitted in an encrypted form to the processor 125, and stored in the memory 135 in the encrypted form.

It is appreciated that identification of each of the smart card processors 145 and 150 may be provided by employing identification means other than the processor identification codes. For example, each of the smart card processors 145 and 150 may have a unique signature, and such unique signature may identify any information transmitted by each of the smart card processors 145 and 150. It is appreciated that any appropriate identification means and methods may be employed to distinguish between the smart card processors 145 and 150.

When the computation task may be resumed, such as when the user inserts the smart card 115 back into the smart card reader 105, or when no real-time computation tasks are pending in the queue, the CPU 155 preferably transmits an instruction to the STB processor 125 to retrieve the first individually marked setting representation from the memory 135 and to provide it back to the smart card processor 145 via the smart card reader 105 and the I/O interface 160.

It is appreciated that since the memory 135 may store setting representations of more than one smart card, a setting representation retrieved from the memory 135 must match a smart card processor from which it was obtained. Thus, when the I/O interface 160 receives a second individually marked setting representation from the memory 135, the I/O interface 160 decrypts the second individually marked setting representation in the encryptor/decrypter 172, if the second individually marked setting representation is received in an encrypted form, separates the second individually marked setting representation into a second processor identification code and a second setting representation, and provides the second setting representation to the CPU and the second processor identification code to the identification apparatus 165.

Preferably, identification apparatus 165 compares the second processor identification code to the first processor identification code and if a match is found, the identification apparatus transmits an indication of the match to the CPU 155 which resumes computation of the task by employing said second setting representation in response to the indication.

It is appreciated that the above mentioned description related to the smart card 115 may be interchangeably related to the smart card 120, and a computation task in the smart card processor 150 may be interrupted rather than a computation task in the smart card processor 145 thus causing the smart card 120 to operate in a similar method of operation as the smart card 115.

It is further appreciated that computation tasks in both smart card processors 145 and 150 may be interrupted substantially simultaneously. In such a case, each of the smart cards 145 and 150 may store individually marked setting representations substantially simultaneously in the memory 135, and the individually marked setting representations may be separated according to the corresponding processor identification codes.

Figure 4:
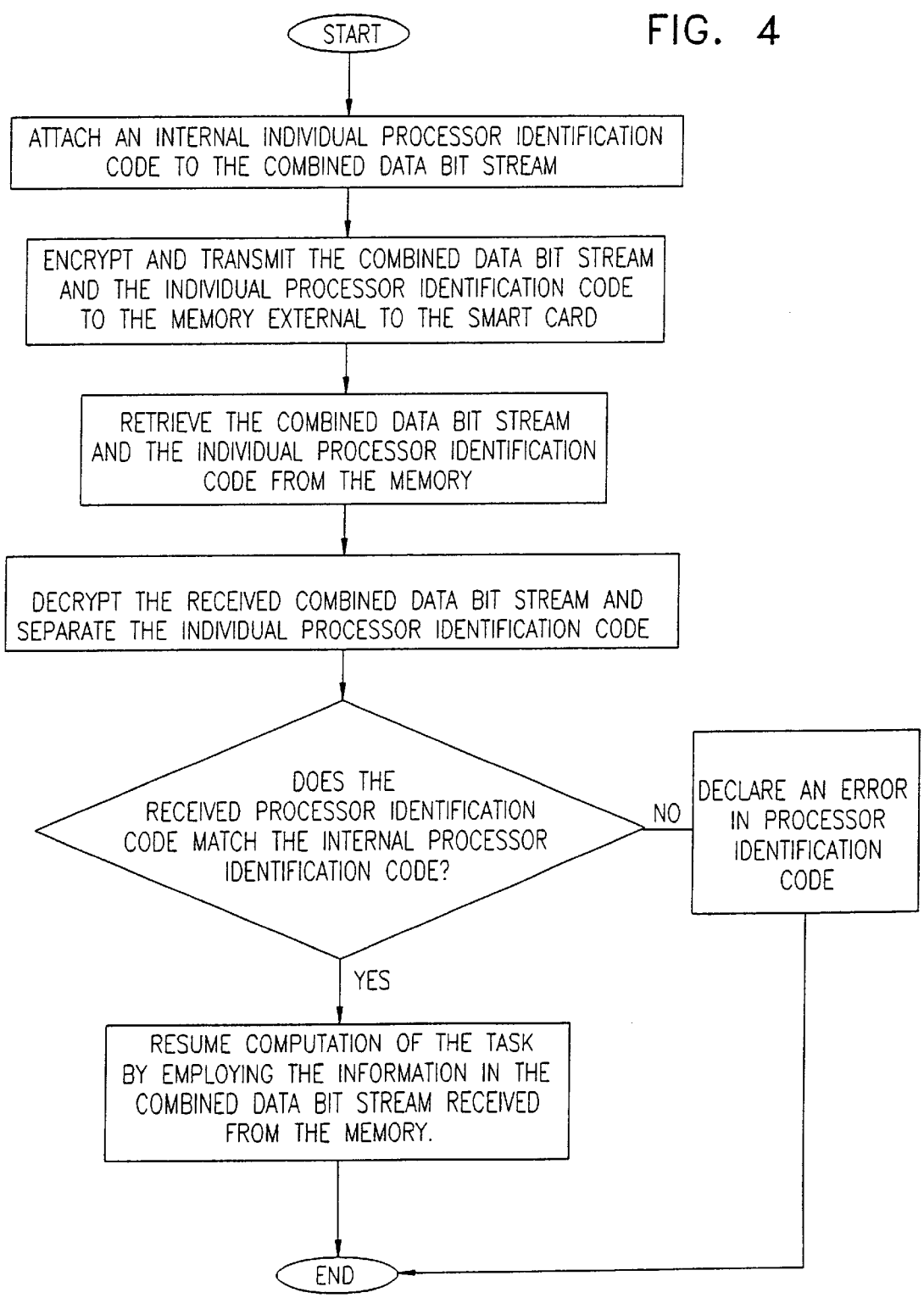
FIG. 4 is a simplified flow chart illustration of a preferred method of operation of the apparatus of FIG. 3.

Reference is now additionally made to FIG. 4 which is a simplified flow chart illustration of a preferred method of operation of the apparatus of FIG. 3.

The method of FIG. 4 is similar to the method of FIGS. 2A and 2B except that the combined data bit stream, obtained when a computation task in a smart card processor, such as smart card processor 145, is interrupted, is further combined with an internal individual processor identification code which individually marks the combined data bit stream as obtained from the smart card processor 145 to form a marked combined data bit stream which is stored in the memory 135.

Preferably, when the combined data bit stream is retrieved from the memory 135 and provided to smart card processor 145, the smart card processor 145 checks if the processor identification code combined in the marked combined data bit stream matches the internal individual processor identification code of the smart card processor 145. If a match is found, the smart card processor resumes the computation task by employing the setting representation associated with the processor identification code retrieved from the memory 135.

The method mentioned above may be preferably applied to a plurality of smart card processors in which computation tasks are interrupted. Preferably, each smart card processor may store and retrieve setting representation in the memory 135 either simultaneously or at different times. Preferably, setting representations originating from different smart card processors are identified by corresponding processor identification codes attached to the setting representations.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described herein above. Rather the scope of the invention is defined only by the claims which follow:

What is claimed is:

1. A method for performing a computation task in a secure processor removably operatively associated with a host comprising a memory external to the secure processor, the method comprising:

computing a portion of the task in the secure processor;

obtaining a setting representation of settings of processing components of the secure processor at the end of said computing step;

encrypting the setting representation to provide an encrypted setting representation;

transmitting said encrypted setting representation to the external memory;

retrieving said encrypted setting representation from the external memory;

providing the encrypted setting representation to the secure processor;

decrypting the encrypted setting representation to reproduce the setting representation; and resuming computation of the task in the secure processor by employing said setting representation.

2. A method according to claim 1 and wherein said secure processor is comprised in a smart card.

3. A method according to claim 1 wherein said setting representation comprises settings of at least one of the following processing components: a program counter; a register; a RAM; a stack pointer; and a stack.

4. A method according to claim 3 and wherein the setting of the RAM includes a representation of the RAM content.

5. A method according to claim 3 and wherein the setting of the stack includes a representation of the stack content.

6. A method according to claim 1 and wherein said step of obtaining comprises converting at least one of said settings of the processing components to a data bit stream.

7. A method according to claim 1 and wherein said external memory is comprised in a host including a set-top box (STB).

8. A method according to claim 1 and wherein said external memory is comprised in a host including a computer.

9. A method according to claim 7 and wherein said computation task is operative to provide conditional access to at least one service provided via the STB.

10. A method according to claim 1 and comprising:

deleting said setting representation from said external memory in response to a disrupting event.

11. A method according to claim 10 and wherein said step of deleting comprises deleting said setting representation after a time-out period.

12. A method according to claim 1 and comprising the step of determining said portion of the task prior to said computing step by determining an end of said portion of the task.

13. A method according to claim 12 and wherein the end of said portion of the task is determined in response to a hardware interrupt.

14. A method according to claim 1 and wherein said computing step comprises:

computing the task in the secure processor until a hardware interrupt indicating a request to process a new real-time task is received at the secure processor; and determining said portion of the task as a portion of the task computed until reception of the hardware interrupt indicating a request to process the new real-time task.

15. A method according to claim 1 and wherein said computing step comprises:

periodically checking whether a new computation task classified as a real-time task is waiting to be processed;

computing the task in the secure processor as long as a real-time task is not waiting to be processed; and if a real-time task is waiting to be processed:
    ceasing computation of the task when the real-time task waiting to be processed is detected; and
    determining said portion of the task as a portion of the task computed until detection of the real-time task waiting to be processed.

16. A method according to claim 15 and also comprising the step of executing the real-time task waiting to be processed.

17. A method for performing a computation task in a secure processor operatively associated with an external memory external to the secure processor, the method comprising:

computing at least a portion of the task in the secure processor;

obtaining a setting representation of settings of processing components of the secure processor at the end of said computing step;

encrypting the setting representation to provide an encrypted setting representation; and employing serial communication to transmit said encrypted setting representation to the external memory for storage in the external memory, and to receive said encrypted setting representation from said external memory for resumption of computation of the task in the secure processor by use of said setting representation being reproduced by decrypting the encrypted setting representation.

18. A method for performing computation tasks in a plurality of secure processors operatively associated with an external memory external to all of said plurality of secure processors, the method comprising:

computing, in each of said plurality of secure processors, a computation task;

recognizing an interruption in computation in a group of secure processors, said group including at least one of said plurality of secure processors;

identifying each secure processor in the group;

obtaining a setting representation of settings of processing components of each secure processor in said group at time of occurrence of said interruption in computation;

encrypting each said setting representation to provide, for each secure processor in said group an encrypted setting representation;

transmitting each said encrypted setting representation corresponding to each secure processor in said group to the external memory;

retrieving so each said encrypted setting representation corresponding to each secure processor in said group from the external memory;

decrypting each said encrypted setting representation to reproduce each said setting representation;

restoring each said setting representation corresponding to each secure processor in said group to each secure processor in the group in accordance with said identifying step; and resuming computation in each secure processor in said group by employing each said setting representation corresponding to each secure processor in said group.

19. A method according to claim 18 and wherein said identifying step comprises the step of employing processor identification codes to identify each secure processor in the group.

20. A smart card comprising:

a smart card processor comprising:

determining apparatus operative to determine a portion of a computation task to be processed;

a central processing unit (CPU), operatively associated with said determining apparatus and operative to compute said portion of a computation task, and to obtain a setting representation of settings of processing components of the smart card processor after said portion of a computation task is computed; and an encryptor/decrypter encrypting the setting representation to provide an encrypted setting representation;

a smart card output interface operatively associated with said smart card processor for transmitting said encrypted setting representation to an external memory external to the smart card; and a smart card input interface operatively associated with said smart card processor for receiving said encrypted setting representation from the external memory, wherein the encryptor/decrypter decrypts the encrypted setting representation received from the external memory to reproduce the setting representation, and said smart card processor is operative to resume computation of the task by employing said setting representation received from the external memory produced by the encryptor/decrypter.

21. A smart card according to claim 20 and wherein said determining apparatus comprises an interrupt controller.

22. A system comprising the smart card of claim 20 and the external memory external to the smart card wherein said external memory is comprised in a set-top box (STB).

23. A system according to claim 22 and wherein said smart card is operative to provide conditional access to at least one service provided via the STB.

24. A secure processor operatively associated with an external memory external to the secure processor, the secure processor comprising:

determination apparatus operative to determine a portion of a computation task to be processed;

identification apparatus operative to identify the secure processor from a plurality of secure processors;

a CPU operatively associated with said determination apparatus and with said identification apparatus and operative to compute said portion of a computation task, and to obtain a first setting representation of settings of processing components of the secure processor after said portion of a computation task is computed;

an encryptor/decrypter encrypting the first setting representation to provide an encrypted first setting representation;

an output interface operatively associated with said CPU and the encryptor/decrypter and operative to transmit said encrypted first setting representation to said external memory; and an input interface operatively associated with said CPU and the encryptor/decrypter and operative to receive a an encrypted second setting representation from said external memory, the encrypted second setting representation resulting from encryption of a second setting representation, wherein the encryptor/decrypter decrypts the encrypted second setting representation to reproduce the second setting representation, and said secure processor is operative to resume computation of the task by employing said second setting representation reproduced by the encryptor/decrypter if the identification apparatus identifies that the second setting representation belongs to the secure processor.

* * * * *

UNITED STATES PATENT AND TRADEMARK OFFICE
CERTIFICATE OF CORRECTION

PATENT NO. : 6,668,326 B1
DATED : December 23, 2003
INVENTOR(S) : Yaron Sella et al.

It is certified that error appears in the above-identified patent and that said Letters Patent is hereby corrected as shown below:

Column 15,
Line 27, delete "so".

Column 16,
Lines 10-11, "from the external memory produced" should read -- reproduced --.
Line 45, delete "a".

Signed and Sealed this

Sixth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,668,326 B1
DATED : December 23, 2003
INVENTOR(S) : Yaron Sella et al.

It is certified that error appears in the above-identified patent and that said Letters Patent is hereby corrected as shown below:

Column 16,
Line 10, delete "received".

Signed and Sealed this

Tenth Day of August, 2004

JON W. DUDAS
*Acting Director of the United States Patent and Trademark Office*